United States Patent

[11] 3,607,987

[72] Inventors Roger J. Walton;
Royce G. Cowan, both of Bartlesville, Okla.
[21] Appl. No. 654,683
[22] Filed July 20, 1967
[45] Patented Sept. 21, 1971
[73] Assignee Phillips Petroleum Company

[54] COATING COMPOSITION COMPRISING POLYETHYLENE AND A VISBROKEN COPOLYMER OF ETHYLENE AND PROPYLENE
6 Claims, No Drawings

[52] U.S. Cl. ................................................ 260/897,
117/132, 117/155, 156/244, 156/334, 161/250,
260/45.85
[51] Int. Cl. ......................................................... C08f 37/18
[50] Field of Search............................................ 260/897

[56] References Cited
UNITED STATES PATENTS
| | | | |
|---|---|---|---|
| 3,340,123 | 9/1967 | Osmon | 156/244 |
| 3,230,288 | 1/1966 | Henderson | 264/176 |
| 3,220,966 | 11/1965 | Flanagan | 260/27 |
| 3,148,059 | 9/1964 | Brunson et al. | 96/27 |

Primary Examiner—Samuel H. Blech
Assistant Examiner—C. J. Seccuro
Attorney—Young and Quigg ABSTRACT: A coating composition comprising a blend of a thermally cracked copolymer containing a major amount of propylene and a low density homopolymer of ethylene and a coating method.

COATING COMPOSITION COMPRISING POLYETHYLENE AND A VISBROKEN COPOLYMER OF ETHYLENE AND PROPYLENE

This invention relates to a new and improved coating composition, coated substrate articles produced using the coating composition, and a method for coating the substrate using the coating composition.

Heretofore various polymers of 1-olefins have been blended with one another in order to obtain coating compositions which can be applied to the substrate at high rates of speed. Up to the present invention, coating speeds of 500 to 600 feet per minute have been considered very high and coating compositions capable of such coating speeds were considered to be excellent and of superior coating ability.

It has now been found that coating speeds substantially greater than 600 feet per minute and even as high as 720 feet per minute can be obtained by using a coating composition comprising a blend of a major amount of a thermally cracked (visbroken) copolymer of ethylene and propylene, the copolymer containing no more than about 5 weight percent ethylene based on the total weight of the copolymer and having a melt flow after visbreaking in the range of from about 40 to about 110, with a minor amount of a low density homopolymer of ethylene.

This invention also relates to an article of manufacture comprising a conventional substrate having on at least one side thereof a coating of the polymer blend of this invention.

This invention also relates to a method of coating a conventional substrate comprising forming the polymer blend of this invention, while extruding at least one layer of the blend onto a conventional substrate, and cooling the resulting laminate to a temperature at least below the softening point of the polymer blend.

The articles produced by this invention are useful as wrapping materials which, after being wrapped about the article or articles to be carried therein, can be heat sealed thereby forming an integral package without the use of external tying means such as string and the like. Thus, the products of this invention have numerous specific utilities in the packaging field which utilities will be obvious to one skilled in the art.

Accordingly, it is an object of this invention to provide a new and improved coating composition. It is another object of this invention to provide a new and improved coated article of manufacture. It is another object of this invention to provide a new and improved coating method.

Other aspects, objects, and advantages of this invention will be apparent to those skilled in the art from the description and appended claims.

According to this invention a coating resin which can be employed in conventional coating processes at coating speeds of 700 feet per minute or better is formed by blending (1) from about 70 to about 90, preferably from about 75 to about 85, weight percent based on the total weight of the final blend of a thermally cracked (visbroken) copolymer of ethylene and propylene, the copolymer containing a finite amount up to and including about 5 weight percent, preferably from about 1 to about 5 weight percent, ethylene based on the total weight of the copolymer, the remainder of the copolymer being substantially propylene and conventional minor amounts of stabilizers and other additives known in the prior art, the visbroken copolymer having a melt flow as determined by ASTM D 1238–62T (Condition L), in the range of from about 40 to about 110, preferably from about 50 to about 100, and (2) from about 10 to about 30, preferably from about 15 to about 25, weight percent based on the total weight of the final blend of a homopolymer of ethylene, said polyethylene having a density in grams per cubic centimeter at 20° C. of less than about 0.930, preferably from about 0.910 to about 0.930. In addition, the polyethylene employed can have a melt index as determined by ASTM D 1238–62T (Condition E) of from about 2 to about 10.

Both the copolymer and the homopolymer employed in the coating composition of this invention can be obtained commercially or can be made by those skilled in the art using presently known procedures. For example the copolymer can be made by the method disclosed in U.S. Pat. No. 2,825,721, the disclosure of which is hereby incorporated herein by reference, and the homopolymer can be produced by the well-known "high-pressure" process.

As is clear from the above, the copolymer component of the coating composition of this invention is visbroken or thermally cracked. By such terms is meant the treatment of the copolymer by heat in a manner such that the melt flow of the polymer is substantially increased. Visbreaking can be effected by any suitable means, e.g. by thermal treatment under suitable conditions of time and temperature with or without mechanical working and the like. Regardless of how the specific visbreaking process is carried out, a presently primary consideration is that the copolymer before visbreaking has a melt flow substantially below about 40, e.g. below about 30, preferably below about 15, and after visbreaking has a melt flow in the range of from about 40 to about 110, all melt flows being determined by ASTM D 1238–62T, Condition L.

One suitable method for visbreaking the copolymer involves passing the polymer through a heated zone in which the temperature is in the range of from about 600 to about 900, preferably from about 700° to about 800° F., using a residence time in the heated zone of from about 3 to about 10 minutes. From the heated zone the visbroken polymer can be conducted through a steam cooled tube wherein the temperature is lowered to below about 500° F. and then into a water bath at ambient temperature.

The visbroken copolymer and the homopolymer can then be blended in the relative amounts disclosed hereinabove in any conventional manner such as by dry blending the polymers in particulate (pellet) form, optionally followed by mixing on a roll mill or in a Banbury mixer, or by solution blending using a solvent such as cyclohexane, or by simply passing the combination of the two polymers through a conventional extruder, preferably a heated extruder. A presently primary objective for this step simply being the obtention of an intimate mixture of the two polymers.

The coating composition of this invention, i.e. the resulting intimate blend of the two polymers, can then be employed in any conventional coating process adapted for the use of polymeric materials as the coating substance. A particularly suitable coating process is extrusion coating through a slot die at a temperature in the range of from about 400° to about 600° F. The extruded film of polymer is drawn through the nip of two rolls together with the substrate to be coated, pressure being applied by the rolls to effect lamination through both physical and chemical reactions between the heated polymer and the substrate. At least one of the pressure rolls is preferably artificially cooled in order to promote the solidification of the polymer. These pressure rolls are situated very close to the exit end of the die, e.g. from about 4 to about 7 inches from the outer surface of the die to the nip of the rolls, and are disposed so that the polymer contacts the substrate at the nip of the rolls. The artificially cooled roll or rolls is cooled in a manner such that the temperature of the surface is below that at which the polymer becomes sticky, i.e. generally below about 200° F. and is usually provided with a variable speed drive by which the extruded polymer is drawn to the desired coating thickness prior to contact with the substrate.

Generally, any conventional substrate can be employed, such substrates including paper, cellophane, metal foils, polyester film, scrim cloth, burlap, and the like. Cellophane-1-olefin polymer combinations are used in the food packaging field, the 1-olefin polymer coating improving the cellophane durability. Aluminum foil is also coated with 1-olefin polymers to permit heat sealing, fill pinholes, and improve puncture resistance and low temperature flexibility. Heat sealability is one reason for coating polyester film with 1-olefin polymers as well as for improving the strength, dimensional stability, and high temperature resistance of the polyester film. One of the best substrates is paper or a paper product such as paperboard (cardboard). Polymers of 1-olefins as coatings on, for example, kraft paper, provides reinforcement and ready printability of the substrate by adding moisture impermeability, heat sealability, and good contents-release characteristics.

EXAMPLE

In this example four extrusion coating runs were made, each using conventional kraft brown paper as the substrate. Two of the coating runs employed a blend of visbroken ethylene-propylene copolymer and low density polyethylene which blends were within the scope of this invention. One coating run employed a blend of visbroken ethylene-propylene copolymer and low density polyethylene not within the scope of this invention. One run employed a conventional propylene polymer available commercially and considered in the coating art to be a good high-speed coating polymer.

Runs 1–3 in this example represent the blends (both invention and noninvention) of the visbroken ethylene-propylene copolymer and low density polyethylene while run 4 represents the commercial propylene polymer.

In making the ethylene-propylene visbroken copolymer for runs 1–3, the same copolymer was used for each run but the copolymer was visbroken to differing melt flow values. The copolymer employed contained about 4 weight percent ethylene based on the weight of the copolymer, substantially the entire remainder being propylene. The copolymer, before visbreaking, had a melt flow of 1½ as determined by ASTM D 1238–62T, Condition L. One portion of the copolymer was visbroken to a 100 melt flow by passing the copolymer through a conventional single screw extruder fitted with an Egan milling head containing eight 8-inch pins, the extruder being heated to a maximum temperature of 650° F., the Egan milling head being heated to a temperature of 605° F., the rate of copolymer feed to the extruder being 57 pounds per hour and the r.p.m. of the extruder screw being 56 r.p.m. A second portion of the copolymer was visbroken to a melt flow of 50 using the same extruder and Egan milling head but using a maximum extruder temperature of 575° F., a maximum Egan milling head temperature of 600° F., a copolymer feed rate of 87 pounds per hour and a extruder screw speed of 68 r.p.m. A third portion of the copolymer was visbroken to a melt flow of 25 using the same extruder and Egan milling head with the difference that the extruder is heated to a maximum temperature of 450° F., the Egan milling head is heated to a maximum of 510° F., the copolymer feed rate to the extruder was 80 pounds per hour, and the extruder screw was operated at 48 r.p.m. Each visbroken copolymer was compounded with 0.07 weight percent ditertiary butyl-p-cresols, 0.25 weight percent distearylthiodipropionate, and 0.12 weight percent 1,1,3-tris(2-methyl-4-hydroxy-5-tert-butylphenol)butane, all weight percents being based on total weight of the copolymer.

The three visbroken copolymers were then blended with separate portions of a homopolymer of ethylene which had a density of 0.914 grams per cubic centimeter at 20° C. and a melt index of 7.8 as measured by ASTM D 1238–62T, Condition E. The copolymer-homopolymer blends for each of runs 1–3 were made so that the final blend contained 80 weight percent copolymer and 20 weight percent homopolymer, both weight percents being based on the total weight of the final blend. The blends for runs 1–3 were made by dry blending pellets of the copolymer and the homopolymer, the pellets being about one-eighth inch in diameter and one-eighth inch in height, at room temperature for about one-half hour.

Thus, for run 1 of this example the coating composition was a polymer blend containing an 80 weight percent visbroken ethylene-propylene copolymer (25 melt flow) and 20 weight percent of an ethylene homopolymer. The coating composition of run 2 was a polymer blend of 80 weight percent visbroken ethylene-propylene copolymer (50 melt flow) plus 20 weight percent ethylene homopolymer. The coating composition of run 3 was a blend of polymers composed of 80 weight percent visbroken ethylene-propylene copolymer (100 melt flow) plus 20 weight percent ethylene homopolymer. The coating composition of run 4 was a propylene polymer marketed by Tennessee Eastman identified as Tenite 4G7DP, having a melt flow of 90 and a density in grams per cubic centimeter at 20° C. of 0.910.

The polymer coatings for each of runs 1–4 were made using a single screw extruder heated at 540° F. and fitted at the outlet end with a slot die, the slot opening having a width of 20 thousandths of an inch. Two pressure rolls, one being a rubber roll and the other a polished steel roll, were placed so that their nip was approximately 5½ inches from the outlet end of the slot die, the steel roll being water cooled to a surface temperature of about 40° F.

The extruded coating composition passed out of the slot die and was mated with the kraft paper substrate at the nip of the rolls to form the polymer coated paper laminate. The coating process for each of runs 1–4 was carried out in a manner such that measured in feet per minute of laminate produced was obtained with minimum coating weight measured in pounds of polymer per ream (3000 square feet) of paper. The results of runs 1–4 as to the maximum line speed obtained with the minimum coating weight were as follows:

| Run | Maximum line speed, feet per minute | Minimum coating weight, pounds per ream |
| --- | --- | --- |
| 1 (25 melt flow) | 60 | 4.0 |
| 2 (50 melt flow) (invention) | 720 | 2.5 |
| 3 (100 melt flow) (invention) | 650 | 2.7 |
| 4 (commercial propylene polymer, 90 melt flow) | 550 | 4.0 |

From the above data it can be seen that the polymer blends within the scope of this invention, i.e. runs 2 and 3, gave excellent results with regard to both maximum line speed and minimum coating weight which results were superior not only to a commercial coating propylene polymer but also to a similar polymer blend which did not contain an ethylene-propylene copolymer which was visbroken to a melt flow in the range of this invention.

All melt flow values given in this example, unless otherwise specified, are determined in accordance with ASTM D 1238–62T, Condition L.

Reasonable variations and modifications are possible within the scope of this disclosure without departing from the spirit and scope thereof.

That which is claimed is:

1. A coating composition comprising a blend of (1) from about 70 to about 90 weight percent based on the total weight of the blend of a visbroken copolymer of ethylene and propylene, said copolymer containing from about 1 to about 5 weight percent ethylene based on the total weight of the copolymer, the remainder being substantially propylene, said copolymer having a melt flow as determined by ASTM D 1238–62T, Condition L after visbreaking in the range of from about 40 to about 110, and (2) from about 10 to about 30 weight percent based on the total weight of the blend of a homopolymer of ethylene, said homopolymer having a density in grams per cubic centimeter at 25° C. of less than about 0.930.

2. The composition according to claim 1 wherein from about 75 to about 85 weight percent of the copolymer based on the total weight of the blend is employed, the visbroken copolymer has a melt flow of from about 50 to about 100, and from about 15 to about 25 weight percent of said homopolymer is employed based on the total weight of the blend, said homopolymer having a density in grams per cubic centimeter at 20° C. of from about 0.91 to about 0.93.

3. The composition according to claim 1 wherein said copolymer is visbroken by being thermally cracked by heating the copolymer at a temperature in the range of from about 600° to about 900° F. for a time sufficient to raise the melt flow of said copolymer from less than 40 into the range of from about 40 to about 110.

4. The composition according to claim 1 wherein said homopolymer has a melt index as determined by ASTM D 1238–62T, Condition E of from about 2 to about 10.

5. An article comprising a substrate and a coating thereon, said coating comprising the blend of claim 1.

6. The article according to claim 5 wherein said substrate comprises a paper product.